F. FIX.
INSOLE REENFORCING AND TRIMMING MACHINE.
APPLICATION FILED SEPT. 28, 1917.
1,404,356.
Patented Jan. 24, 1922.
4 SHEETS—SHEET 3.
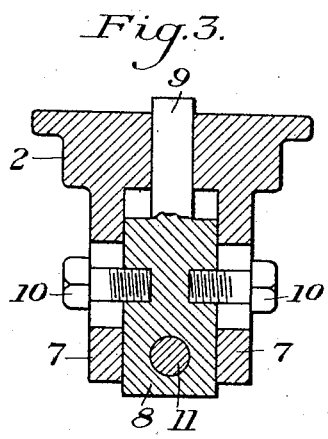
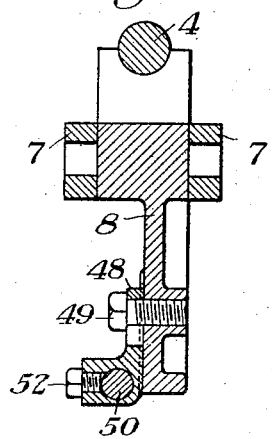
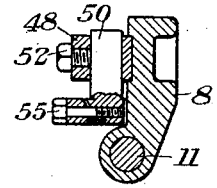
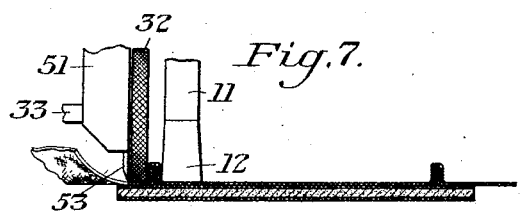
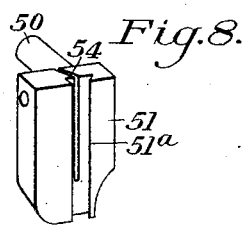
WITNESSES
INVENTOR

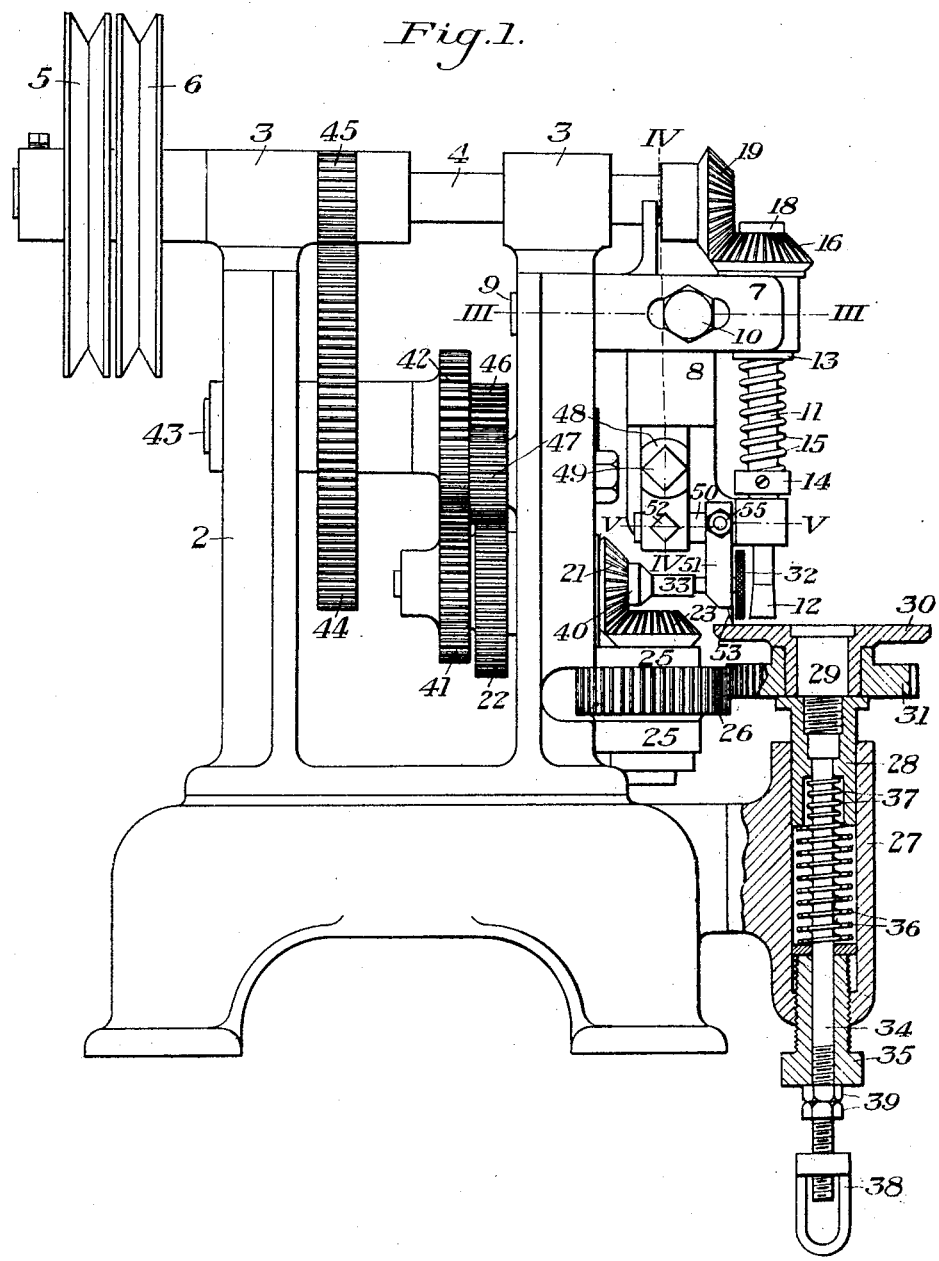

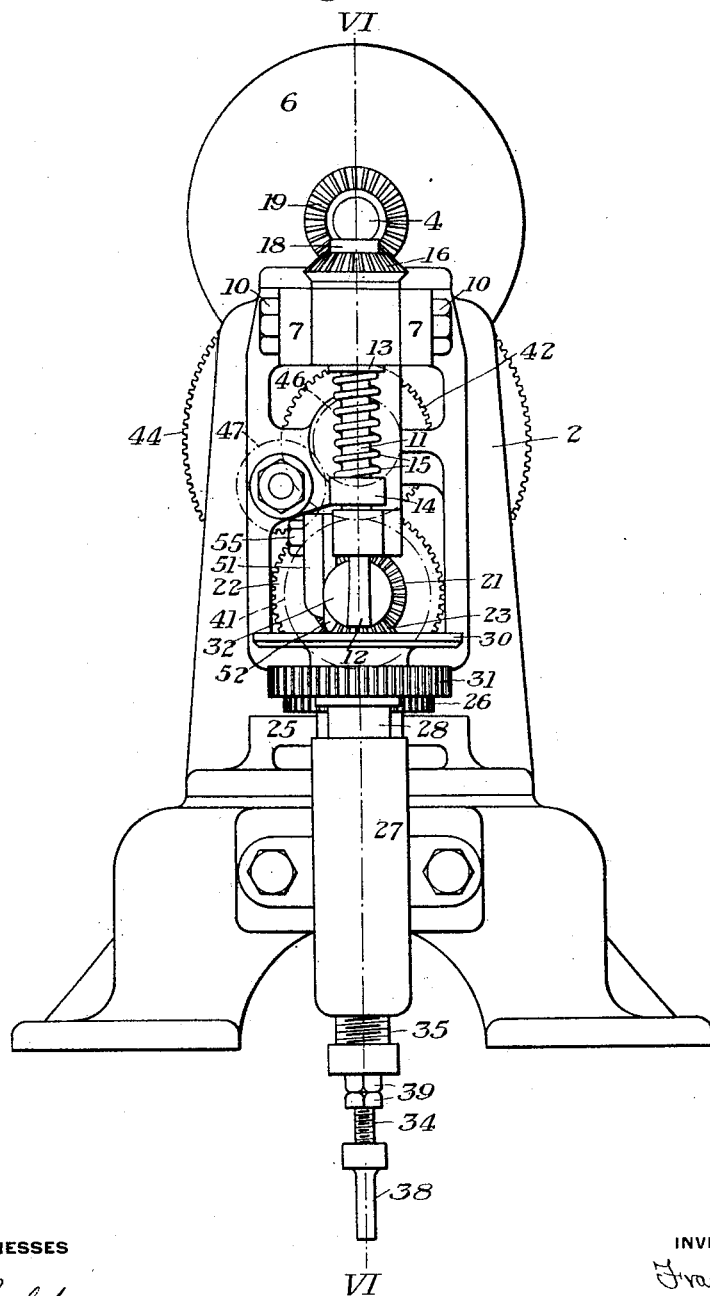

UNITED STATES PATENT OFFICE.

FRANK FIX, OF CINCINNATI, OHIO, ASSIGNOR TO ARMSTRONG CORK COMPANY, OF PITTSBURGH, PENNSYLVANIA, A CORPORATION OF PENNSYLVANIA.

INSOLE REENFORCING AND TRIMMING MACHINE.

1,404,356.

Specification of Letters Patent. Patented Jan. 24, 1922.

Application filed September 28, 1917. Serial No. 193,728.

*To all whom it may concern:*

Be it known that I, FRANK FIX, a citizen of the United States, residing at Cincinnati, in the county of Hamilton and State of Ohio, have invented a new and useful Improvement in Insole Reenforcing and Trimming Machines, of which the following is a full, clear, and exact description, reference being had to the accompanying drawings, forming part of this specification, in which—

Figure 1 is a side elevation of one form of my improved machine.

Figure 2 is a front view thereof.

Figure 3 is a detail sectional view on the line III—III of Figure 1.

Figures 4 and 5 are similar views on the lines IV—IV and V—V, respectively, of Figure 1.

Figure 7 is a detail sectional view through an insole showing the tools in connection therewith, and Figure 8 is a detail perspective view of the knife holder.

Figure 6:
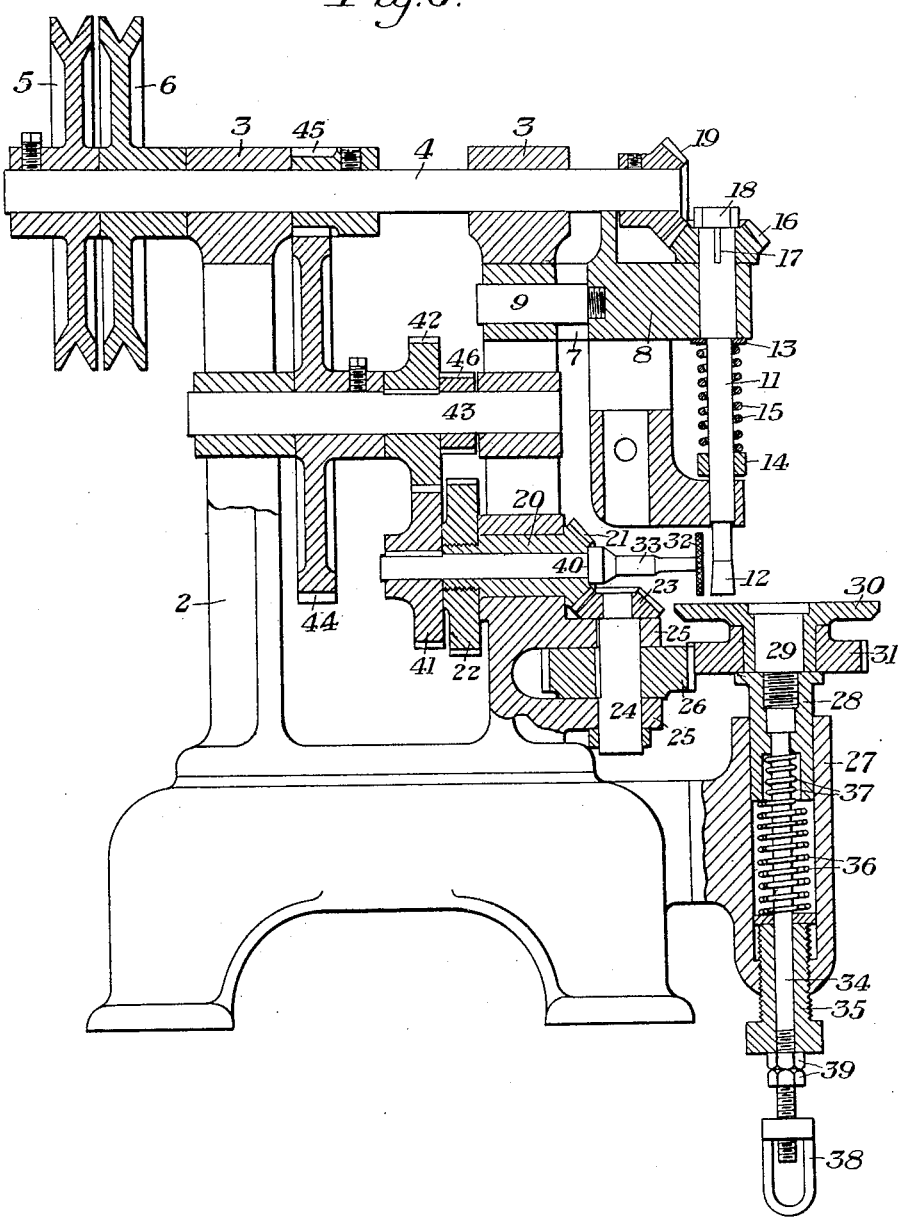
Figure 6 is a sectional view on the line VI—VI of Figure 2.

This invention relates to an improvement in insole reenforcing and trimming machines, and is designed to provide an inexpensive and compact machine in which all of the operating parts are positively driven from the main driving shaft. Another object of my invention is to provide an auxiliary frame in which the forming roller is journaled, which is arranged to be adjusted to move the forming roller with relation to the forming and feed wheel. Still another object of my invention is to provide a knife holder in which the knife is adjustably secured, and which knife holder is readily adjusted with relation to the feed wheel and the insole, in order to properly position the knife to trim the surplus reenforcing stock from the finishing insole.

The precise nature of my invention will be best understood by reference to the accompanying drawings, which will now be described, it being premised, however, that various changes may be made in the details of construction without departing from the spirit and scope of my invention, as defined in the appended claims.

Referring to the accompanying drawings, the reference character 2 designates the main frame and 3 bearings mounted thereon. 4 is the main driving shaft rotatably mounted in the bearings 3 and provided with a fast pulley 5 and a loose pulley 6. Adjustably mounted between arms or projections 7, which extend from the main frame 2, is an auxiliary frame 8 having a rearwardly extending stem 9 which engages an opening in the main frame 2, and which projection is arranged to form a guide for the auxiliary frame to maintain it in alignment with the main driving shaft. This auxiliary frame is connected to the arms or projections 7 by means of cap screws 10. Rotatably mounted in bearings in the auxiliary frame 8 is a spindle 11, which is provided with a forming roller 12 at the lower end thereof, which may be formed integral therewith, or removably secured thereto. Surrounding the spindle 11, and interposed between a washer 13 and a collar 14 is a coil spring 15, the collar 14 being arranged to be adjusted on the spindle in order to vary the tension of the spring. The washer 13 forms an abutment for the upper edge of the spring and engages the under face of the upper bearing in the auxiliary frame 8. The upper end of the spindle 11 is arranged to slidably engage a beveled gear 16 to permit the spindle to move upwardly with relation thereto, and is provided with a key 17 which engages a keyseat in the gear 16, so that the spindle is positively rotated therewith. This spindle is also provided with a head 18 at the upper end thereof for determining the downward movement of the spindle under the action of the spring 15. This beveled gear 16 meshes with a similar beveled gear 19 on the end of the main driving shaft 4, there being sufficient clearance between the teeth to permit a slight adjustment of the auxiliary frame for the purpose hereinafter described.

Rotatably mounted in a bearing in one of the standards of the main frame 2 is a sleeve 20, having a beveled gear 21 connected to one end thereof and a spur gear 22 connected to the other end thereof. The beveled gear 21 meshes with a beveled gear 23 connected to one end of a short shaft 24. This shaft 24 is rotatably mounted in bearings 25 in the main frame, and has keyed thereto a spur gear 26. Slidably mounted in a cylindrical guide 27 connected to the main frame of the machine is a sleeve 28, the upper end of which carries a stud screw 29. 30 is a rotatable table held in position on the sleeve 28 by the stud screw 29, and connected to a boss on this table is a spur gear 31 which is in mesh with the spur gear 26, so that the table will be positively rotated. This table 30 is arranged below the forming roller on the end of the spindle 11 and a forming and feed wheel 32 on the end of a shaft 33.

34 designates a screw rod which passes through the sleeve 28 and is provided with a head engaging a shoulder on the sleeve for moving the sleeve and turn-table downwardly when inserting an insole into the machine. The lower end of this screw rod is arranged to slide in a bushing 35 in the lower end of the guide 27, and has a screw threaded connection therewith for adjusting the tension of the springs 36 and 37, surrounding the rod 34, and which are arranged to retain the table in its upward position. 38 is a yoke connected to the lower end of the rod 34 for connecting a treadle member to the rod to lower the table, and 39 are nuts on this rod for determining the upward movement of the rod under the action of the springs 36 and 37.

The forming and feed wheel shaft 33 extends through the sleeve 20 and is provided with a shoulder 40 which retains the shaft from rearward movement in the sleeve. The other end of this shaft is provided with a spur gear 41 which meshes with a spur gear 42 on a shaft 43. This shaft 43 is rotatably mounted in bearings in the standard of the frame 2, and has connected thereto a spur gear 44 which meshes with a spur gear 45 on the main driving shaft. Connected to this shaft 43 is another spur gear 46 which meshes with an idle spur gear 47 on a stud shaft, and which gear also meshes with the spur gear 22, through which power is transmitted to the rotary table.

Adjustably mounted on the auxiliary frame 8 is a bracket 48, which is held in its adjusted position by a screw 49. This bracket is provided with a transverse cylindrical opening for the reception of a cylindrical stem 50 of a knife holder 51, and 52 is a stud screw for securing its stem 50 in its adjusted position in the bracket 48. The knife holder 51 is provided with an undercut groove 51ª for the reception of a knife 53. This knife holder is split, as indicated at 54, to permit the parts to be drawn together by means of screw 55 to clamp the knife in position in the holder.

By adjusting the auxiliary frame in and out, the position of the spindle 11 and the forming roller on the end thereof is adjusted relative to the face of the feed wheel 32 to provide the required space between these members for shaping the lip or rib on the insole.

By means of the adjustments in the bracket 48 and the knife holder 51, the position of the knife with relation to the lip on the insole can readily be adjusted, as well as the height of the knife with relation to the top of the insole.

The advantages of my invention result from the provision of a combined lip forming and trimming machine in which one of the forming members and its supporting frame can readily be adjusted with relation to the other former, together with adjustable knife holder parts carried by the auxiliary frame, and arranged to permit an adjustment of the knife in all directions without shifting the knife relative to its holder, as well as means for permitting the knife to be adjusted with relation to the holder.

I claim:

1. A device of the character described, comprising a main frame, a driving shaft rotatably mounted therein, a work table arranged to rotate about a vertical axis, forming rollers adapted to coact with each other and the work table, a vertical stub shaft adjacent the work table, a gear wheel on the stub shaft, a second gear wheel arranged to rotate the work table and meshing with the gear wheel on the stub shaft, and gearing connecting said forming rollers and said stub shaft with the main driving shaft, substantially as described.

2. A device of the character described, comprising a main frame, a horizontal driving shaft rotatably mounted therein, a work table arranged to rotate about a vertical axis, forming rollers adapted to coact with each other and the work table, a vertical stub shaft adjacent the work table, a pinion connected to said shaft, a second pinion arranged to rotate the work table, means for yieldingly holding the work table in an elevated position, the gear wheel connection between the stub shaft and work table being arranged to permit vertical movement of the work table, and gearing connecting the main shaft with the stub shaft and with the forming rollers, substantially as described.

3. A device of the character described, comprising a main frame, a horizontal shaft rotatably mounted therein, a horizontal countershaft rotatably mounted in the frame, gearing connecting the main driving shaft and the countershaft, a work table arranged to rotate about a vertical axis, a forming roller adapted to rotate about a horizontal axis, gearing connecting said forming roller with the countershaft, a sleeve surrounding the spindle of the forming roller, gearing connecting said sleeve with the countershaft, a stub shaft arranged to rotate about a vertical axis adjacent to the work holding table, gearing connecting the work holding table and the stub shaft, and bevel gears connecting the sleeve and the stub shaft, substantially as described.

4. A device of the character described, comprising a main frame, a horizontal shaft rotatably mounted therein, a horizontal countershaft rotatably mounted in the frame, gearing connecting the main driving shaft and the countershaft, a work table arranged to rotate about a vertical axis, a forming roller adapted to rotate about a horizontal axis, gearing connecting said forming roller with the countershaft, a sleeve surrounding the spindle of the forming roller, gearing connecting said sleeve with the countershaft, a stub shaft arranged to rotate about a vertical axis adjacent to the work holding table, gearing connecting the work holding table and the stub shaft, bevel gears connecting the sleeve and the stub shaft, a vertical spindle having a rib-forming member on the lower end thereof adapted to co-act with the forming roller for forming the rib, and gearing connecting said spindle and the driving shaft, substantially as described.

5. A device of the character described, comprising a main frame, a horizontal driving shaft journaled in the main frame, a horizontal countershaft journaled in the main frame, a work table arranged to rotate about a vertical axis, a forming roller adapted to rotate about a horizontal axis, a second forming roller adapted to rotate about a vertical axis, the horizontal forming roller having a spindle which is rotatably mounted in a sleeve mounted in the main frame, a vertical stub shaft adjacent to the work table, gearing connecting the work table to the stub shaft, gearing connecting the stub shaft to the sleeve, gearing connecting the sleeve to the countershaft, gearing connecting the horizontal forming roller with the countershaft, and gearing connecting the vertical spindle with the driving shaft, the axes of all of said members being in the same vertical plane, substantially as described.

6. A device of the character described, comprising a main frame, an auxiliary frame adjustably carried thereby, a forming roller carried by said auxiliary frame, a driving shaft rotatably mounted in the main frame, a work table, means for driving said forming roller and said work table from said driving shaft, a bracket adjustably carried by said auxiliary frame, and a knife holder adjustably carried by said bracket for co-operation with said forming roller and work table, substantially as described.

7. A device of the character described, comprising a main frame, a driving shaft rotatably mounted therein, a work table arranged to rotate about a vertical axis, a feed roller arranged to rotate about a horizontal axis, a shaft for said feed roller driven by said driving shaft, a sleeve surrounding said shaft, a vertical stub shaft adapted to be driven by said sleeve, gearing connecting said stub shaft and said work table, an auxiliary frame adjustably carried by said main frame, a forming roller mounted in said auxiliary frame for co-operation with said work table, a knife holder adjustably secured to said auxiliary frame, and a knife adjustably mounted in said holder, substantially as described.

In testimony whereof, I hereunto set my hand.

FRANK FIX.